United States Patent
Borgström

(10) Patent No.: US 6,994,832 B2
(45) Date of Patent: Feb. 7, 2006

(54) MODULAR OZONE GENERATOR SYSTEM

(75) Inventor: Jan Borgström, Landskrona (SE)

(73) Assignee: Ozonator Production AB, Loddekopinge (SE)

( * ) Notice: Subject to any disclaimer, the term of this patent is extended or adjusted under 35 U.S.C. 154(b) by 255 days.

(21) Appl. No.: 10/311,191

(22) PCT Filed: Jun. 15, 2001

(86) PCT No.: PCT/SE01/01355

§ 371 (c)(1),
(2), (4) Date: Dec. 13, 2002

(87) PCT Pub. No.: WO01/96235

PCT Pub. Date: Dec. 20, 2001

(65) Prior Publication Data

US 2003/0147787 A1 Aug. 7, 2003

Related U.S. Application Data

(63) Continuation of application No. 09/663,806, filed on Sep. 15, 2000.

(30) Foreign Application Priority Data

Jun. 15, 2000 (SE) ............................................. 0002252

(51) Int. Cl.
B01J 19/12 (2006.01)

(52) U.S. Cl. ............................ 422/186.19; 422/186.07; 422/186.14

(58) Field of Classification Search ............... 422/186, 422/186.07, 186.14, 186.18, 186.19, 186.2
See application file for complete search history.

(56) References Cited

U.S. PATENT DOCUMENTS 6,599,486 B1 * 7/2003 Borgström ............. 422/186.07

* cited by examiner

Primary Examiner—Rodney G. McDonald
(74) Attorney, Agent, or Firm—Boyle, Fredrickson, Newholm, Stein, Gratz, S.C.

(57) ABSTRACT

An ozone generator system (1) in which a multitude of plate type ozone generators (2) are arranged adjacent to each other in a block (3). Each ozone generator comprises a chamber, adapted for converting oxygen to ozone by a corona discharge, and each chamber is provided with an inlet for oxygen or an oxygen-rich gas and an outlet for ozone. Said ozone generators are arranged in a block module (26) in which they are affixed by a block rack (4). Said block rack comprises an inlet port (5) adapted for introduction of oxygen gas, and an outlet port (6) adapted for discharge of ozone created through conversion within the generators comprised in the block module. A multitude of first conduits (7), each running between said inlet port and one chamber inlet, and a multitude of second conduits (8), each running between said outlet port and one chamber outlet, are provided within said block rack. Said conduits are arranged so that the flow distance between the inlet and outlet ports has the same length, regardless of which generator the introduced gas passes through, thereby achieving an even gas pressure and gas flow, through parallel connection of the generators.

28 Claims, 2 Drawing Sheets

MODULAR OZONE GENERATOR SYSTEM

CROSS-REFERENCE TO RELATED APPLICATIONS

This case is the United States national filing of PCT Application Ser. No. PCT/SE01/01355, filed on Jun. 15, 2001, which claims priority to Sweden Application No. SE 0002252-5, filed on Jun. 15, 2000, now U.S. Pat. No. 6,599,486 and U.S. application Ser. No. 09/663,806, filed on Sept. 15, 2000, the entireties of which are incorporated by reference herein.

FIELD OF THE INVENTION

The present invention relates to ozone generators adapted for ozone generation by subjecting oxygen to a high-frequency alternating current (AC) of high-voltage over a dielectric medium. More precisely, the invention relates to an ozone generator system wherein a multitude of plate type ozone generators are arranged in a block, and wherein one or several blocks may be comprised in a modular ozone generator system.

BACKGROUND

Ozone has highly oxidising properties and is used, preferably in diluted form, for sterilisation of water. For example, sewage water can be treated with the aim of decomposing or eliminating environmentally or health hazardous substances therefrom, as well as removing unpleasant odours from the water, and drinking water can be pre-treated with the intention of improving the quality of the water. Other areas of use are e.g. as a bleaching agent in the paper industry, for air cleaning and for performing certain oxidation reactions within organic chemistry.

Ozone is produced by letting oxygen, or a gas rich in oxygen, pass through an electrical discharge. Oxygen or an oxygen-rich gas is thereby allowed to flow through a chamber in an ozone generator, said chamber being defined either by two co-axial tubes, or a series of plates, between which tubes or plates an electrical discharge is taking place. In this description, the terms space and chamber are used as denomination for the same thing, i.e. the location inside the ozone generator where existing oxygen or oxygen-rich gas is converted into ozone. The first mentioned type of ozone generator is, for industrial purposes, very large and bulky, and difficult and costly to manufacture and maintain. The second type of ozone generator, here called the plate type, is less demanding in terms of economy and space. As the demand for reliable, large capacity ozone generators tends to increase, plate type ozone generators are often arranged on top of each other in blocks, whereby larger ozone generator systems can be obtained. Some examples of such ozone generator systems are disclosed in WO 97/01507 by Arlemark, and in U.S. Pat. No. 5,435,978 by Yokomi.

One problem associated with ozone generators is connected with the chamber, in which oxygen in the form of oxygen gas or a gas rich in oxygen is converted into ozone, having at least one delimiting surface made of a dielectric material, a so-called dielectric. This dielectric is used for the purpose of generating a corona during the discharge between a high-voltage electrode and ground, and normally consists of a ceramic or glass material. Pressure variations in the gas fed into the chamber, for example caused by pressure chocks in the system when the gas supply is switched on or off, will generate high strains in the ceramic material, entailing a risk of cracking it. This problem naturally also tends to increase if, with the aim of increasing the capacity, an increased pressure of the introduced oxygen gas is used. If, furthermore, there is an imbalance in pressure and/or flow between different generators, and between the inlet and outlet ports of the individual generators, the stress upon the total system will be even higher. In ozone generator systems arranged in blocks, it is a further problem if the entire system has to be closed down if one generator breaks down.

Another problem is associated with the very reactive properties of the ozone, entailing a tendency for hoses and rubber seals to deteriorate and cause leakage. This applies for example to the seals and gas lines required in connection with the oxygen inlets and the ozone outlets. In ozone generator systems having several generators in a block, this problem will become especially obvious, as at least one inlet and one outlet is required for each generator.

Another problem connected to large ozone generator systems is that they have to be arranged at the location where the ozone is to be used, due to the short life span of the ozone before it disintegrates. As a consequence of the ancillary equipment, such as the connections required for oxygen, ozone and cooling water, having to be constructed on site, the cost of installation tends to become very high.

OBJECT OF THE INVENTION

A general object of the present invention is to provide an ozone generator that eliminates the problems of the known art.

An aspect of this object, using an arrangement of an ozone generator system in which generators are arranged in blocks, is to increase the productivity and improve the efficiency compared to known ozone generator systems, and, beyond that, prevent parts of the device from being damaged or to degenerate due to vibrations and shocks encountered during operation, caused by pressure shocks and excessive pressure in the introduced gas, the electrical discharges in the generator chambers, or uneven gas or coolant flows.

Another aspect of this object is to provide a design of a block type ozone generator system adapted for easy maintenance, and arranged so as to be minimally sensitive to the reactive effect of the ozone.

A further aspect of this object is to provide an ozone generator system designed in such a way that existing moisture in the introduced gas is expelled from the system during operation.

Still another aspect of this object is to provide a design allowing easy de-aeration of the system coolant.

Still another aspect of this object is to provide a design eliminating differences in pressure and flow within the ozone generator system.

Still another aspect of this object is to provide a design allowing easy checking of seals in the gas system.

SUMMARY OF THE INVENTION

According to a first aspect, the present invention relates to an ozone generator system in which a multitude of plate type ozone generators is arranged adjacent to each other in a block. Each ozone generator comprises a high-voltage electrode, a ground electrode and a dielectric, and a chamber, located between said electrodes, for converting oxygen to ozone by a corona discharge between said electrodes over said dielectric. Further, each chamber is provided with an inlet for oxygen or an oxygen-rich gas and an outlet for ozone. Said ozone generators are arranged in a block rack adapted for fixing the ozone generators into said block, said block and block rack defining a block module. According to said first aspect, the invention is characterised by said block rack comprising an inlet port adapted for the introduction of oxygen and an outlet port adapted for the discharging of ozone created through conversion in the generators comprised in the block module. A multitude of first conduits, each running between said inlet port and one chamber inlet, and a multitude of second conduits, each running between said outlet port and one chamber outlet, are provided within said block rack.

By providing conduits within the block rack, running to and from all generator chambers in the block module, no hoses will be needed, and the number of seals required will be reduced, as conduit junctions can be arranged entirely without joints. Through providing said conduits in such a manner that the distance between the block rack inlet and outlet will have the same length, regardless of which generator the introduced gas passes through inside the module, an even gas flow and an even gas pressure is achieved through parallel connection, securing an increased reliability of operation and allowing operation with an increased gas pressure.

According to a second aspect, the present invention relates to an ozone generator arrangement in which a multitude of plate type ozone generators are arranged adjacent to each other in a block, mechanically secured by means of block fixation means. In one embodiment said arrangement comprises a single block of generators, wherein said block fixation means is a block rack, devised to fix and secure the generators in one block. In another embodiment said arrangement comprises two or more blocks of generators, wherein the block fixation means is a module rack, devised to fix and secure modules of generator blocks into one module system. According to said second aspect of the invention, each generator of a block in the arrangement comprises coolant ducts provided in respective ground electrodes of the generators, and coolant conduits to and from the generators are formed and defined within said block fixation means.

In one embodiment a single coolant inlet port is arranged on said block fixation means, connected to all of said coolant conduits leading to the generators, and a single coolant outlet port is arranged on said block fixation means, connected to all of said coolant conduits leading from the generators.

Preferably an electronic unit, comprising means for controlling or monitoring the ozone generation process in a generator, is mounted directly on said block fixation means. Advantageously, said electronic unit comprises heat conducting means for transferring heat from the electronic unit to the block fixation means. In one embodiment said electronic unit is mounted on said block rack. In one embodiment said electronic unit is mounted on said module rack.

According to a third aspect, the invention relates to an ozone generator arrangement in which a multitude of plate type ozone generators are arranged adjacent to each other in a block, said ozone generators being arranged in a block module comprising a block rack adapted for fixing the ozone generators into said block, characterised in that the generators comprise gas ducts provided in respective ground electrodes for transportation of gas to and from the generators, and where gas conduits to and from the generators are defined within said block rack Preferably a single gas inlet port is arranged on said block rack, connected to all of said gas conduits leading to the generators, and a single gas outlet port is arranged on said block rack, connected to all of said coolant conduits leading from the generators.

BRIEF DESCRIPTION OF THE DRAWINGS

The invention will be described in further detail below, with reference to the accompanying drawings, on which

DETAILED DESCRIPTION OF PREFERRED EMBODIMENTS

Figure 1:
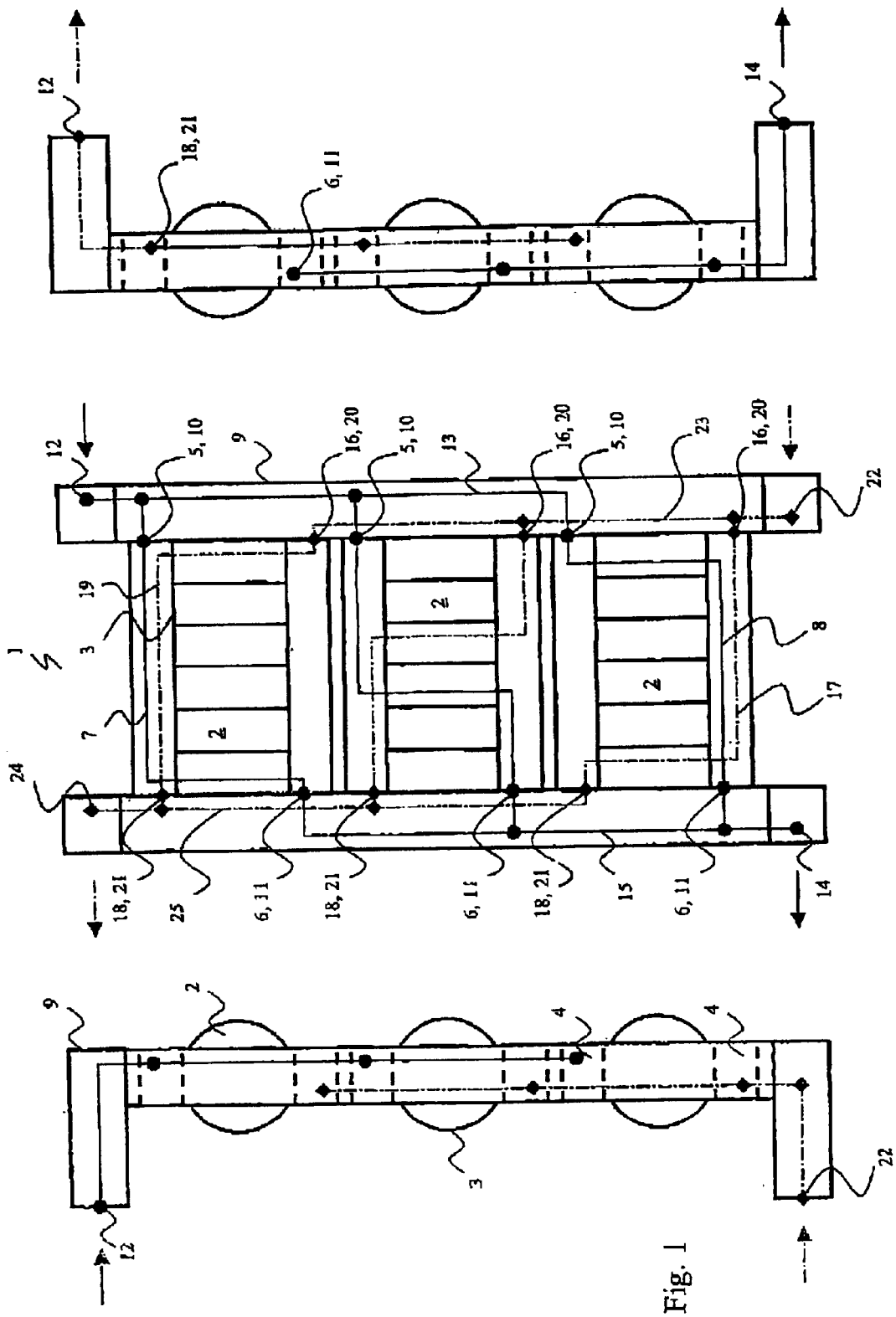
FIG. 1 illustrates a modular ozone generator system according to a preferred embodiment of the invention.

FIG. 1 shows an ozone generator system 1 according to the present invention, comprising a multitude of plate type ozone generators 2 arranged adjacent to each other in blocks 3. Even if only some of the generators and the blocks in the figure are provided with reference numbers, with the aim of making the figure as clear as possible, it is clearly shown in the figure that the illustrated embodiment of the invention comprises three blocks 3, each comprising six generators 2. Likewise, it should be understood that the person skilled in the art could easily modify the proposed embodiment into containing an arbitrary number of blocks comprising an arbitrary number of generators. Thus, the illustrated preferred embodiment is solely to be regarded as an example. Each ozone generator 2 comprises, in a not shown but well known manner, a high-voltage electrode, a ground electrode and a dielectric and a chamber, located between said electrodes, for converting oxygen into ozone by a corona discharge between said electrodes over said dielectric. Further, each chamber is provided with at least one inlet for oxygen or an oxygen-rich gas and at least one outlet for ozone. There are several different designs of plate type generator available in the market, and the specific design of the individual generator is not essential to the invention. However, it is to be understood that all generators 2 within the system 1 are of the same type and size. The illustrated generators are circular, but it should be understood that an arbitrary shape could be applied to the invention, e.g. oval, triangular, square, rectangular, pentagonal, etc.

Said ozone generators 2 are arranged in a block rack 4 for each block 3. In the simplified and exemplifying figure, each block rack 4 comprises two crossbars, i.e. one top bar and one bottom bar. It will be understood that numerous different manners of arranging the block rack are conceivable, and that the illustrated example is not to be understood as limiting, but illustrative only. In the figure, only the lower block rack is provided with a reference denomination, in order to enhance the clarity of the figure. In a not shown manner, the block racks 4 mechanically affix the generators 2 into a block 3. Together, the block 3 and the block rack 4 define a block module 26. Characterising for the invention is, that said block rack 4 comprises an inlet port 5, adapted for introducing the oxygen gas, and an outlet port, adapted for discharging the ozone, created through conversion in the generators 2 comprised in the block module 26. A multitude of first conduits 7, running between said inlet port 5 and each one chamber inlet, and a multitude of second conduits 8, running between said outlet port 6 and each one chamber outlet, are provided within said block rack 4. With the aim of simplifying the figure, only the conduits 7 to, and 8 from, one generator 2 are shown, but it will be understood that corresponding conduits will exist within the block rack 4 for all generators 2 of the block module 26, extending in parallel between the inlet port 5, the generator, and the outlet port 6, respectively.

The block rack 4 thus serves both as a mechanically retaining element for the block 3, and as an inlet and outlet device for the generators 2 comprised in the block module 26. By providing conduits running to and from all generator chambers within the block rack 4, no hoses will be needed, and the number of seals required can be reduced, as junctions within the conduits 7, 8 can be arranged entirely without joints. Furthermore, only one connection 5 for the introduction of oxygen to the generators 2 comprised in the block module 26 is needed, and only one connection for the ozone discharge therefrom, which will reduce the number of seals as well as warrant a reduced installation cost and an increased reliability of operation.

Furthermore, both maintenance and troubleshooting are simplified, as an entire block module 26 can be replaced and be pressure tested for the detection of any leaks. In a preferred embodiment, the conduits 7 and 8 at each generator connection further provided with a pressure sensor, thereby further simplifying trouble-shooting as, by a pressure test, one can immediately gather which one, if any, of the generators 2, that is leaking.

The total distance, from the inlet port 5 to the outlet port 6, via the generator and the conduits 7 and 8, has the same length for each generator within a block module 26. Thus, all generators 2 comprised in the block module 26 are connected in parallel, having an equally long distance of flow between the inlet port 5 and the outlet port 6, regardless of which generator 2 the introduced gas will pass through. Therefore, any pressure drops or pressure chocks within the gas supplied to the block rack 4, preferably oxygen gas or an oxygen-rich gas, or any irregularities in the gas flow, will tend to be levelled out and become equal in all chambers of the generators 2 comprised in the block module 26. This will result in the load on the different generators 2 comprised in the system tending to be equal, no individual generator 2 thus running the risk of being subjected to highly excessive stress. This will warrant an enhanced service life compared to state of the art ozone generator systems.

Preferably, said block module 26 can be placed in a module rack 9, adapted for supporting a multitude of such block modules 26, the block modules 26 preferably being removable from the module rack 9 by means of a simple operation. From the figure it is observable how three block modules 26 are supported in a lying-down arrangement by the module rack 9. The module rack 9, together with the included block modules 26, form a module system, corresponding to the ozone generator system 1 illustrated in the figure. For each block module 26, said module rack 9 comprises a supply connection 10, adapted for the supply of oxygen to said inlet port 5, and a discharge connection 11, adapted for the discharge of ozone from said outlet port 6. In the figure, which is not shown in detail, the inlet port 5 and the supply connection 10 are symbolically illustrated as one unit, but the person skilled in the art will understand that the illustrated connection comprises both these elements. The same of course applies for elements 6 and 11. According to the invention, said module rack 9 has only one collective inlet port 12, from which third conduits 13 are provided within the module rack 9 up to each supply connection 10, and only one collective outlet port 14, from which fourth conduits 15 are provided within the module rack 9 up to each discharge connection 11.

By providing said third 13 and fourth 15 conduits, to and from all block modules 26 arranged in the module rack 9 of the system 1, no hoses will be needed, and the number of seals required can be reduced, as junctions within the conduits 13, 15 can be arranged entirely without joints. Furthermore, only one connection 12 for the introduction of oxygen to the block modules 26 comprised in the system 1 is needed, and only one connection 14 for the ozone discharge therefrom, which will reduce the number of seals as well as warrant a reduced installation cost.

Preferably, said block modules 26 are designed to be placed at correspondingly adapted locations in the module rack 9, as illustrated in the figure, whereby the inlet ports 5 of the block racks 4 comprised in the block modules 26 will be connected in an airtight manner to their respective supply connections 10, and the outlet ports 6 will likewise be connected in an airtight manner to their respective discharge connections 11. As a result of this arrangement, a block module 26 can easily be removed from the module rack 9, whereby the connections 10 and 11 will preferably be equipped with valves in order to close off the possibility of gas flow communication there-through. This will improve the maintenance and repair possibilities, as one block module will be quickly exchangeable for a new one. Furthermore, the number of block modules 26 within the module system 1 can be easily decreased or increased according to the required ozone production.

Like in the block rack 4, the conduits 13 and 15 in the module rack 9 are arranged in parallel, in such a way that the distance from the collective inlet port 12 to the collective outlet port 14 will be the same, regardless of which block module 26 the introduced gas will pass through. The advantages thereof are reflected in what has been stated above for the individual block module 26.

In a preferred embodiment, each block module 26 comprises a block rack 4 supporting a lying-down block 3 comprising a multitude of ozone generators 2, and the module rack 9 is, according to the illustrated embodiment, arranged for supporting a multitude of block modules 26, located one above the other. This creates a module system 1 as illustrated in the figure. The person skilled in the art will however understand that an arrangement with standing blocks 3 could just as well be selected, and that the orientation is not of any crucial importance for the invention.

In a preferred embodiment of the ozone generator system according to the invention, the generators 2 comprised in the block module 26 include coolant ducts provided in the respective ground electrode, whereby a coolant inlet port 16 is provided on said block rack 4, and a multitude of first coolant inlet ducts 17, extending from said coolant inlet port 16 to the coolant ducts of each one generator 2 are defined within said block rack 4, and whereby a coolant outlet port 18 is provided on said block rack 4, and a multitude of first coolant outlet ducts 19, extending from the coolant ducts of each one generator to said coolant outlet port 18 are defined within said block rack 4. Through this arrangement, which, in accordance with what has been discussed regarding the gas conduits, applies to all generators and provides an equally long flow distance for the coolant, from the coolant inlet port 16 to the coolant outlet port 18, regardless of which generator is passed, a parallel connection is achieved that provides an even pressure and flow in the coolant system of the entire block module 26.

Further, said module rack 9 for each block module 26 comprises a first coolant connection 20 for the inflow of coolant to said coolant ducts via said coolant inlet port 16, and a second coolant connection 21 for the outflow of coolant from said coolant ducts via said coolant outlet port

18. For the sake of clarity, all coolant ducts are illustrated as dot-dashed lines and rhomb-shaped connections and junctions, while gas conduits are illustrated as continuous lines and ring-shaped connections and junctions. As described earlier, the block modules are easily removable from the module rack 9, whereby the connections 20 and 21 will preferably be equipped with valves in order to close off the possibility of coolant flow communication therethrough. This will improve the maintenance and repair possibilities, as one block module 26 will be quickly exchangeable for a new one. Furthermore, the number of block modules 26 within the module system I can be easily decreased or increased according to the required ozone production. According to the invention, said module rack 9 has only one collective coolant inlet port 22, from which second inlet ducts 23 are provided up to each first coolant connection 20, and only one collective coolant outlet port 24, to which second coolant outlet conduits 25 are provided from each second coolant connection 21. Similarly to what has been described for the gas conduits in the module rack 9, the proposed design will result in an equally long distance of flow between the collective coolant inlet port 22 and the collective coolant outlet port 24, regardless of which block module 26 the coolant will pass through. This will warrant an even pressure and flow in the coolant system of the module rack 9.

By the arrangement shown in the figure, where the collective coolant outlet 24 is arranged at the top of the module rack 9, according to a preferred embodiment of the invention, a suitable bleeding valve for the purpose of removing air from the coolant system is provided at the coolant outlet 24.

The present invention will substantially reduce the installation cost for ozone generator systems comprising a multitude of generators 2. By arranging the generators 2 into blocks 3, retained by block racks 4 into block modules 26, and arranging the block modules 26 into module racks 9 in case several block modules are required, the ozone generator system 1 can be easily enlarged in a modular manner. In spite of this, the module system I will have only four external connections; 12, 14, 22, 24. Of these, the connection 12 is of course adapted for connection to a gas source, preferably oxygen gas or an oxygen-rich gas, whereas the connection 14 is adapted for connection to a suitable ozone line. A cooling water source can be connected to the connection 22 and a cooling water dump or a return line to said cooling water source to the connection 24. By the proposed arrangement, time and cost are therefore saved when installing the ozone generator system 1, at the same as the modular design allows an unprecedented possibility for easy maintenance and trouble-shooting. The arrangement with conduits and junctions arranged in block racks and module racks furthermore reduces the number of required seals and hoses, warranting increased service reliability.

The arrangement provided by the invention allows the ozone generator system to work as a pressure reservoir, as there will be substantially the same pressure in all parts of the gas system. Through avoiding excessive pressures in parts of the system, for example due to pressure shocks or design-induced pressure losses, a higher inlet pressure can be utilised, thus also improving the conversion factor.

With an appropriate design of the module system l it is of course also possible to combine several module systems into a group, whilst still achieving only one inlet port and one outlet port for oxygen/ozone and coolant, respectively. This could for example be arranged by a separate ozone conduit from one side of the module rack 9 to the other, for connection of a collective gas discharge outlet belonging to one module rack 9 to a collective gas discharge outlet belonging to another module rack 9. In this manner a modular system group can be obtained, comprising several module systems 1. The modular design disclosed by the invention can of course be continued into an unending number of levels, and will make it very easy for an ozone supplier to customise, in size, an ozone generator system for a customer whilst still achieving a simple installation with a minimum of external connections.

Purely hierarchically, the ozone generator system according to the invention can be described as follows:
1) A generator 2, comprising a gas chamber and a coolant duct;
2) A block 3, comprising a multitude of generators 2, placed adjacent to each other;
3) A block rack 4, comprising means for mechanical fixation of a block 3, and connection means for parallel supply and discharge of gas and coolant to each generator 2 of a block 3;
4) A block module 26, comprising a block rack 4 and a block 3 arranged therein;
5) A module rack 9, comprising means for mechanical fixation of block modules 26, and connection means for parallel supply and discharge of gas and coolant to each block module 26;
6) A module system 1, comprising a module rack 9 and a number of block modules 26 arranged therein;
7) A module system group, comprising several connected module systems 1, said module system group exhibiting only one inlet and one outlet port for gas, and one inlet and one outlet port for coolant, respectively, for the generators 2 comprised therein.

A supplier can thus offer an ozone generation arrangement comprising only one generator 2, a block module comprising several generators 2 arranged in parallel, a module system 1 comprising several block modules 26 arranged in parallel, or a module system group comprising several module systems 1, and yet provide a system that on the one hand allows an even pressure and flow both in the gas and the coolant system, on the other has only one external connection of each type; i.e. an inlet and an outlet, for gas and coolant, respectively.

Figure 2:
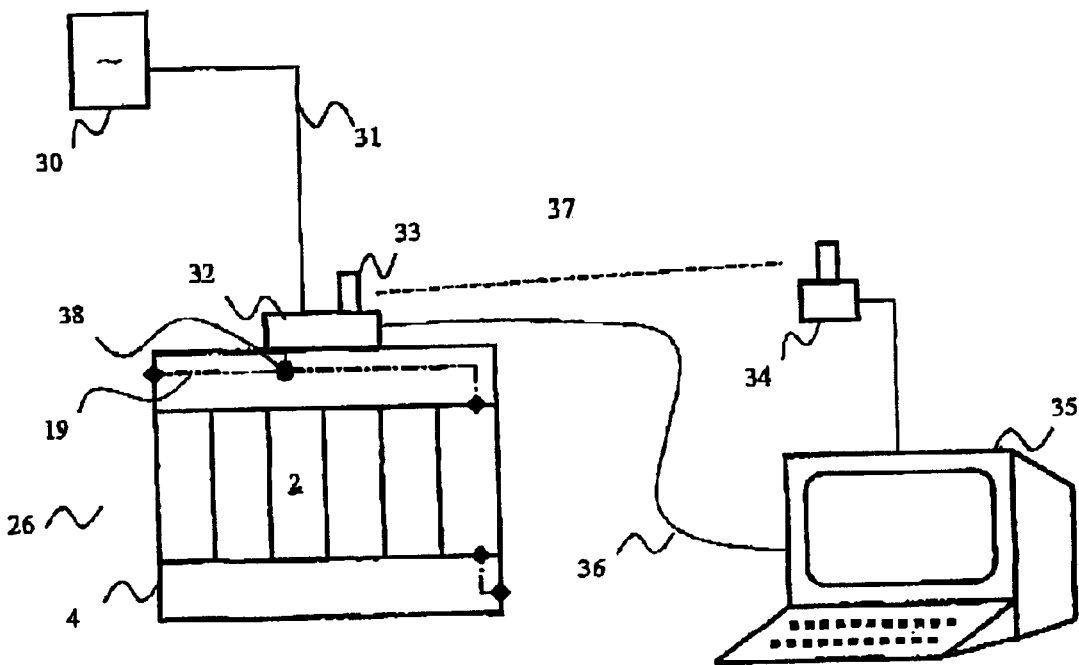
FIG. 2 schematically illustrates a block module of ozone generators according to an embodiment of the present invention, having an electronic unit attached thereto.

Turning now to FIG. 2, an embodiment of one module 26 including a block 3 of generators 2 is schematically illustrated, the block 3 being mechanically supported in the module 26 and fixed by a block rack 4. In FIG. 2 only the cooling fluid conduits 17,19 for one generator 2 are illustrated, whereas the person skilled in the art realises that, according to what has already been explained, each generator 2 is connected to separate connections for input and output of cooling fluid from and to the conduits 17,19 of the block rack 4. The conduits 7,8 for gas have been left out of the drawing completely, for the purpose of facilitating understanding of certain features of the invention.

In order to operate the generators 2, a high voltage alternating electric current is needed, which current has to be supplied to one or several high voltage electrodes of each generator, as is well known from the prior art. Generally, the high voltage supplied to the generators originates from a separate power source 30, or is simply taken from a present main circuit connection 30, and is delivered to the ozone generators 2 by cable 31 or some other current supply means 31.

However, the operation of the ozone generators 2 will generally need some form of function for control or automatic engineering of the ozone generating process for optimisation of the oxygen-to-ozone conversion, or a function for monitoring the operation parameters such as temperature, pressure, electric voltage and frequency etc. For example, the supplied high voltage alternating current may need some adjustment upon application to the generator electrodes, in terms of frequency, phase or amplitude. This is preferably achieved by some form of electronic unit 32. The electronic unit 32 is, in one embodiment, a high voltage unit, comprising means for adjusting the frequency of the current applied to one or several generators, e.g. in dependence of the reactivity of the load that the generators 2 constitute. In another embodiment the electronic unit 32 comprises data processing means, such as a CPU connected to data memory means, and a computer program product for controlling aspects of the current applied to one or several ozone generators 2, in dependence of certain input characteristic parameters, such as temperature, pressure, gas flow rate, input gas composition, etc. In another embodiment, the electronic unit comprises sensor control means, including a certain sensor or sensors, or connections to such a sensor 38 or sensors, for sensing a characteristic parameter of the operating conditions, such as a temperature, pressure, gas flow rate, input gas composition, etc.

The electronic unit 32, regardless of the type of unit used, preferably includes means for control communication, such as a connector for a communication wire 36, or an antenna 33 for wireless communication 37 with a transceiver 34, connected to a remotely located system control unit 35. Such a system control unit may be a standard computer 35 arranged with a computer program for reading and interpreting said parameter characteristics, and for communicating control parameters to the electronic unit 32. Preferably, the system control unit 35 also comprises data presentation means, such as a display, and data input means, such as a keyboard, so that an operator may monitor and control the ozone generating process.

The electronic unit 32 will generate heat during operation, like all electronics does, and in certain embodiments it is therefore desirable to cool the electronic unit 32. According to the invention, a common means 4,9 is used for both fixation of the ozone generators 2 or modules 26, and for communicating gas and cooling fluid to and from the ozone generators 2. Taking benefit thereof, the electronic unit 32 is preferably placed on said common means 4,9 for both fixation of the ozone generators 2 or modules 26, and for communicating cooling fluid, thereby being cooled by the same cooling system used for the generators 2. In a preferred embodiment, the means for fixation, i.e. the block rack 4 or module rack 9, is formed in metal, such as aluminium, steel, stainless steel, or some other suitable metal or alloy. Furthermore, the electronic unit 32 comprises a heat conductor 39, such as a base plate or housing, in metal.

Figure 3:
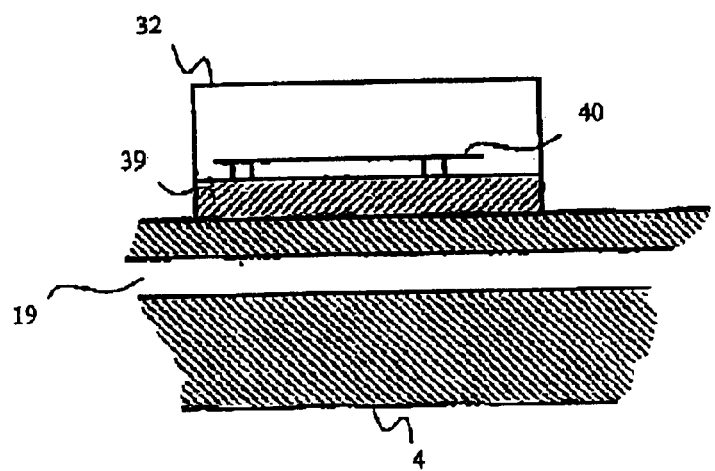
FIG. 3 illustrates parts of the embodiment from FIG. 2, enlarged and in cross section.

Turning now to FIG. 3, a section of an example of an embodiment of the invention is illustrated, including a part of the top bar of block rack 4, and the electronic unit 32. A cooling fluid conduit 19 arranged in this top bar of the block rack 4 is illustrated, whereas the gas supply conduits are left out. The electronic unit 32 has a body face formed as the outer bottom of a base plate 39, which body face is formed to fit on a corresponding body face on the top bar block rack 4. In the figure these body faces are represented by the junction between electronic unit 32 and block rack 4, and the specific shape of the body faces may be rectangular, round, or any other suitable shape. Fastening means, such as bolts or screws, or some form of snap on arrangement, are preferably used to fix the electronic unit to the block rack 4, though not shown in the figure.

The electronic unit 32 comprises an electronic module 40, such as a printed circuit board 40, which is attached to or in the vicinity of the base plate 39. In the illustrated embodiment the base plate 39 constitutes the heat conductor 39, and may also comprise means for arranging the electronic module 40 thereto. The electronic module 40 carries the electric components and circuits of the electronic unit, and will generate heat during operation. By the arrangement according to the invention, and as exemplified by the drawing in FIG. 4, the electronic unit 32 will be cooled by the same cooling system, comprising cooling conduits 19, used for cooling the ozone generators 2, by means of the heat conductor 39 of the electronic unit 32. Heat is transported from the electronics 40 of the electronic unit 32, via the heat conductor comprising the metal base plate 39, to the body of the top bar of the block rack 4, which is cooled by the cooling fluid passing in conduit 19. Needless to say, a corresponding arrangement can be made by placing the electronic unit 32 on the bottom bar of the block rack 4, or on the module rack 9, in the latter case cooling the electronic module 40 by heat conduction to a part of the module rack 9 that is cooled by the coolant conduits 23,25 arranged therein. Cooling of the electronics 40 may also be assisted by a fan (not shown) located in the electronic unit 32.

Said electronic unit 32 may be central, i.e. common for several or all of the generators 2 in the block module 26 or the system 1, or a separate electronic unit 32 may be applied for each generator 2. In the illustrated example, one electronic unit 32 is used for six ozone generators arranged in one block module 26. An advantage with such an arrangement is that the wiring to the generator system is decreased.

Preferred embodiments of the invention have been described in detail, but it is still obvious that variations are conceivable, within the scope defined by the appended claims.

What is claimed is:

1. An ozone generator arrangement in which a multitude of plate type ozone generators are arranged adjacent to each other in a block, mechanically secured by means of block fixation means, characterised in that the generators comprise coolant ducts provided in respective ground electrodes, where coolant conduits to and from the generators are defined within said block fixation means, and wherein an electronic unit, comprising means for controlling or monitoring the ozone generation process in a generator, is mounted directly on said block fixation means.

2. The ozone generator arrangement as recited in claim 1, wherein a single coolant inlet port is arranged on said block fixation means, connected to all of said coolant conduits leading to the generators, and a single coolant outlet port is arranged on said block fixation means, connected to all of said coolant conduits leading from the generators.

3. The ozone generator arrangement as recited in claim 1, wherein said electronic unit comprises heat conducting means for transferring heat from the electronic unit to the block fixation means.

4. The ozone generator arrangement as recited in claim 1, wherein said block fixation means is a block rack devised to mechanically fix the generators in said block, on which block rack said electronic unit is mounted.

5. The ozone generator arrangement as recited in claim 1, wherein said block fixation means comprises a module rack devised to mechanically fix a plurality of modules of generator blocks, on which module rack said electronic unit is mounted.

6. The ozone generator arrangement as recited in claim 1, wherein said electronic unit comprises a CPU.

7. The ozone generator arrangement as recited in claim 1, wherein said electronic unit comprises sensor control means, including a sensor or a connection to a sensor, for sensing a characteristic parameter of operating conditions in at least one of said plate type ozone generators.

8. The ozone generator arrangement as recited in claim 7, wherein said characteristic parameter is temperature.

9. The ozone generator arrangement as recited in claim 7, wherein said characteristic parameter is pressure.

10. The ozone generator arrangement as recited in claim 7, wherein said characteristic parameter is gas flow rate.

11. The ozone generator arrangement as recited in claim 7, wherein said characteristic parameter is input gas composition.

12. The ozone generator arrangement as recited in claim 1, wherein said electronic unit comprises means for control communication, connected to a remotely located system control unit.

13. The ozone generator arrangement as recited in claim 7, wherein said means for control communication comprises a connector for a communication wire connected to the remotely located system control unit.

14. The ozone generator arrangement as recited in claim 12, wherein said means for control communication comprises an antenna for wireless communication with a transceiver connected to the remotely located system control unit.

15. The ozone generator arrangement as recited in claim 1, wherein said electronic unit comprises an electronic module, and a base plate arranged in contact with the block fixation means, wherein the electronic module is attached to or in the vicinity of the base plate.

16. The ozone generator arrangement as recited in claim 1, wherein said electronic unit is common for several or all of said multitude of plate type ozone generators.

17. The ozone generator arrangement as recited in claim 1, wherein a separate electronic unit is applied for each one of said multitude of plate type ozone generators.

18. An ozone generator arrangement comprising:
a plurality of plate type ozone generators;
a rack carrying the plurality of plate type ozone generators and configured to communicate coolant to or from at least one of the plurality of plate type ozone generators; and
an electronic monitor or controller carried by the rack and that monitors or controls the ozone generation process of at least one of the plurality of plate type ozone generators.

19. The ozone generator arrangement as recited in claim 18, further comprising a sensor linked to the electronic monitor or controller that senses a characteristic parameter of operating conditions of at least one of the plurality of plate type ozone generators.

20. The ozone generator arrangement as recited in claim 18, wherein the electronic monitor or controller is disposed adjacent coolant being communicated to or from at least one of the plurality of plate type ozone generators such that heat generated by the electronic monitor or controller is transferred to the coolant.

21. The ozone generator arrangement as recited in claim 20, further comprising a heat conductor that conducts heat from the electronic monitor or controller to the rack.

22. The ozone generator arrangement as recited in claim 18, further comprising a remotely located system control unit that is linked to the electronic monitor or controller.

23. The ozone generator arrangement as recited in claim 22, wherein the system control unit comprises a computer that is wirelessly linked to the electronic monitor or controller.

24. The ozone generator arrangement as recited in claim 18, wherein the electronic monitor or controller comprises an electronic controller configured to adjust electric current supplied to the at least one of the plurality of plate type ozone generators.

25. An ozone generator arrangement comprising:
a plurality of plate type ozone generators each including a coolant duct;
a rack carrying the plurality of plate type ozone generators and having a cooling conduit in fluid flow communication with the coolant duct of each one of the plurality of plate type ozone generators; and
an electronic monitor or controller fixed to the rack and that monitors or controls the ozone generation process of at least one of the plurality of plate type ozone generators.

26. An ozone generator arrangement comprising:
a plurality of plate type ozone generators each including a coolant duct;
a rack carrying the plurality of plate type ozone generators and having a cooling conduit in fluid flow communication with the coolant duct of at least one of the plurality of plate type ozone generators; and
an electronic ozone generation process monitor or controller mounted to the rack adjacent the coolant conduit such that heat generated by the electronic ozone generation process monitor or controller is transferred to coolant in the coolant conduit.

27. An ozone generator arrangement comprising:
a plurality of plate type ozone generators each including a coolant duct;
a rack carrying the plurality of plate type ozone generators and having cooling conduits in fluid flow communication with the coolant duct of each one of the plurality of plate type ozone generators;
an electronic ozone generation process monitor or controller carried by the rack; and
a heat conductor disposed between the electronic ozone generation process monitor or controller and the rack that conducts heat generated by the electronic ozone generation process monitor or controller to the rack.

28. An ozone generator arrangement comprising:
a plurality of plate type ozone generators each including a coolant duct;
a rack carrying the plurality of plate type ozone generators and having a cooling conduit in fluid flow communication with the coolant duct of at least one of the plurality of plate type ozone generators;
an electronic ozone generation process monitor or controller carried by the rack;
a sensor used to sense a characteristic parameter of operating conditions of at least one of the plurality of plate type ozone generators, the sensor linked to the electronic ozone generation process monitor or controller; and
a remotely located system control unit that is linked to the electronic ozone generation process monitor or controller.

* * * * *

UNITED STATES PATENT AND TRADEMARK OFFICE
CERTIFICATE OF CORRECTION

PATENT NO. : 6,994,832 B2
DATED : February 7, 2006
INVENTOR(S) : Jan Borgstrom

Page 1 of 1

It is certified that error appears in the above-identified patent and that said Letters Patent is hereby corrected as shown below:

Column 11,
Line 20, delete "7" and substitute -- 12 --.

Signed and Sealed this

Second Day of May, 2006

JON W. DUDAS
*Director of the United States Patent and Trademark Office*